Dec. 2, 1924. 1,517,386
J. O. ALMEN
PISTON BEARING FOR INTERNAL COMBUSTION ENGINES
Filed Dec. 23, 1921 2 Sheets-Sheet 1
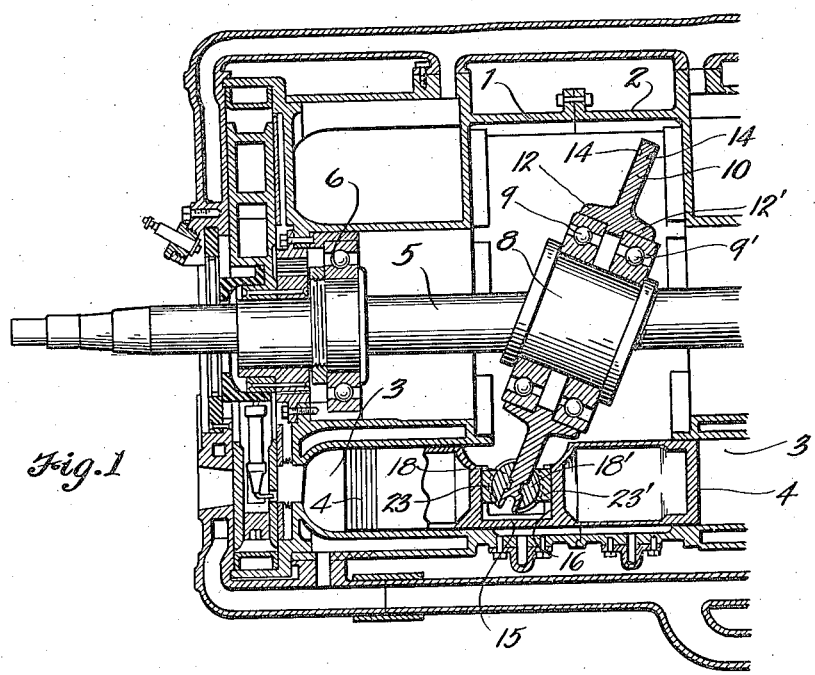
Fig.1
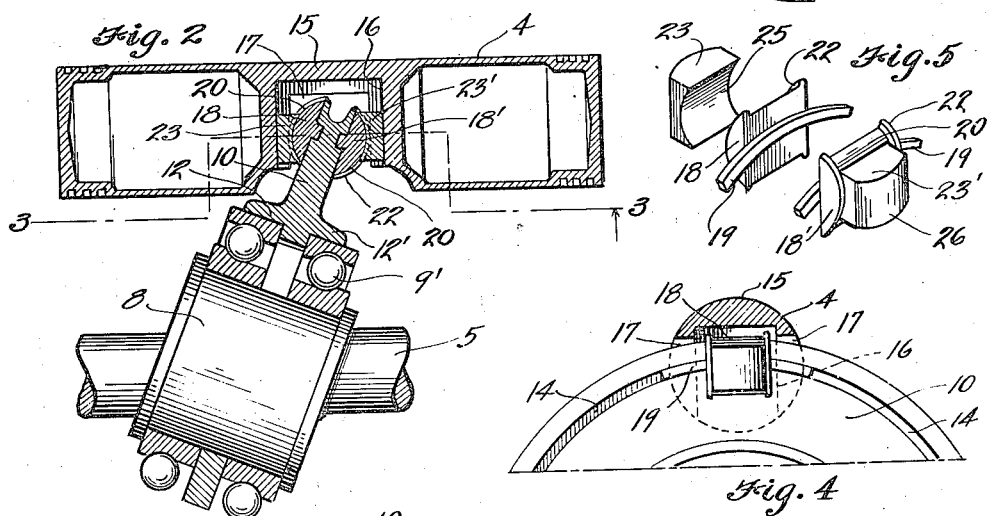
Fig.2 Fig.5
Fig.4
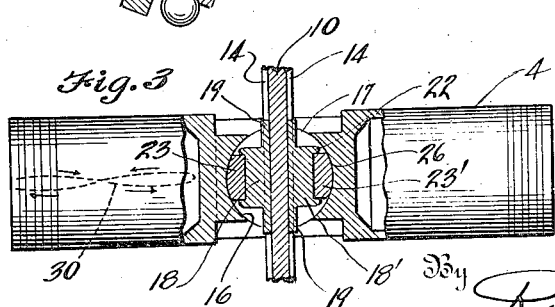
Fig.3
Inventor
JOHN O. ALMEN
By Attorney
Richard J. Cook Dec. 2, 1924.
J. O. ALMEN
1,517,386
PISTON BEARING FOR INTERNAL COMBUSTION ENGINES
Filed Dec. 23, 1921    2 Sheets-Sheet 2
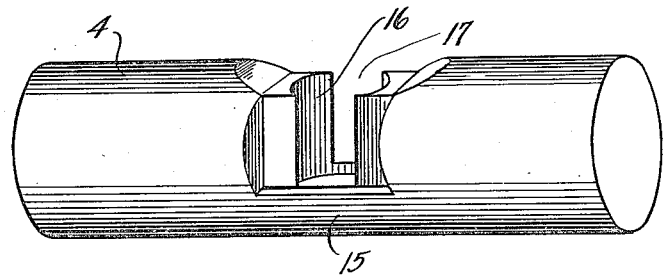
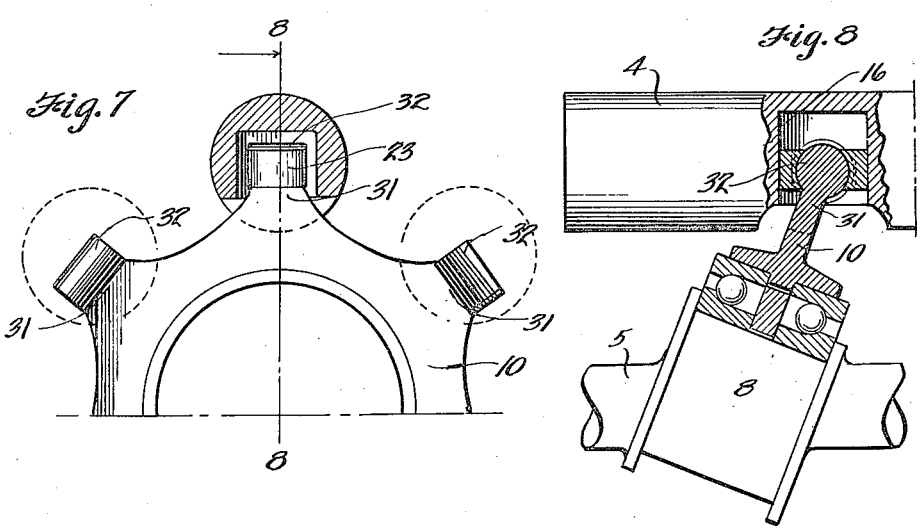
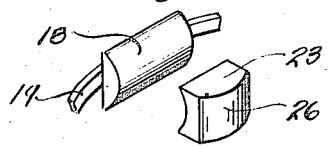
Inventor
JOHN O. ALMEN
By Richard J. Cook
Attorney Patented Dec. 2, 1924.

1,517,386

UNITED STATES PATENT OFFICE.

JOHN O. ALMEN, OF SEATTLE, WASHINGTON.

PISTON BEARING FOR INTERNAL-COMBUSTION ENGINES.

Application filed December 23, 1921. Serial No. 524,426.

*To all whom it may concern:*

Be it known that I, JOHN O. ALMEN, a citizen of the United States, and a resident of the city of Seattle, county of King, State of Washington, have invented certain new and useful Improvements in Piston Bearings for Internal-Combustion Engines, of which the following is a specification.

My invention relates to internal combustion engines, and more particularly to improvements in connecting bearings for use between the rocker plate and pistons in internal combustion engines of that type described and illustrated in my copending application for improvements in valve mechanism for internal combustion engines, filed August 10, 1920, and bearing Serial Number 402,565.

The object of the present invention is to improve upon the means of connecting the pistons with the power shaft, as previously disclosed, in order to secure a construction that is easily assembled, that permits all of the necessary movements of the connected parts relative to each other during operation and will, at the same time, impart to the pistons certain turning movements as they reciprocate which facilitates lubrication and prevents scoring of the walls of the pistons and cylinders wherein they operate.

Other objects of the invention reside in the details of construction of the bearing members and pistons, and in the combination of these parts with the pistons and the rocker plate, whereby lateral pressure on the piston walls is prevented, a desirable driving connection is effected with the power shaft, and creeping of the rocker plate is prevented.

In accomplishing the objects of the invention, I have provided the improved details of construction, the preferred forms of which are illustrated in the accompanying drawings, wherein—

Figure 1 is a longitudinal section of an engine embodying improvements in bearing construction embodied by the present invention.

Figure 2 is an enlarged, detail, sectional view of a piston and a part of the crank shaft, connected by means of a disk having bearings constructed and assembled according to the present invention.

Figure 3 is a horizontal section taken on the line 3—3 in Figure 2.

Figure 4 is a side view of a portion of the rocker disk with bearings mounted thereon, and showing a piston in central section.

Figure 5 is a perspective view of the bearing members having pistons in disconnected relation.

Figure 6 is a perspective view of a piston removed from the engine.

Figure 7 is a partial side view of a rocker head of an alternative construction.

Figure 8 is a sectional view substantially on the line 8—8 in Figure 7.

Figure 9 is a perspective view of a bearing block of an alternative type.

Referring more in detail to the several views of the drawings—

1 and 2 designate complemental housings, or cylinder casings, each of which embodies a plurality of circularly arranged cylinders 3 wherein pistons 4 are operatively mounted for reciprocation. Extending longitudinally and centrally through the casing, in parallel alinement with the cylinders, is a power shaft 5 supported adjacent its ends with anti-friction bearings 6 which retain it rigidly in functional alinement with respect to the pistons.

Formed on the drive shaft, between the inner ends of the cylinders, is a journal 8, the axial line of which bisects the axial line of the shaft at an acute angle and, mounted revolvably upon this journal through the intermediacy of two spaced apart sets of ball bearings 9—9', is a rocker disk 10 through which power is transmitted from the pistons to the shaft. The disk 10, in the first described construction, is of a ring-like character, having oppositely extending flanges 12—12' adjacent its inner periphery that are adapted to overlie and support the disk functionally upon the bearings 9—9' and, about its outer periphery, in its opposite faces, are concentrically formed grooves 14.

The pistons, operating in alined cylinders of the two casings, are cast integral and, in the connecting central portions 15, have bores 16 therein perpendicular to their axial lines and opening inwardly toward the center of the engine, and the opposite sides of the pistons are cut away forming openings into the bore, as shown at 17, so that the periphery of the rocker disk 10 may operate therein. Connection between the disk 10 and each of the several pistons is made in the following manner:

Disposed against opposite faces of the disk, are bearing blocks 18—18', having flat, inner surfaces seated against the opposite surfaces of the disk and provided with integrally cast, arcuate guide ribs 19 on these faces which seat slidably in the grooves 14 to retain the bearings in functional relation thereto. These blocks have their outer surfaces 20 curved cylindrically about the same axial line, as is illustrated best in Figure 2, and are provided at their opposite ends with flanges 22 for the purpose of retaining these blocks against longitudinal movement with respect to cooperating bearing blocks 23—23' that are mounted thereon.

The blocks 23—23' are of such length that they fit between the end flanges of the blocks 18—18' and have cylindrically curved, inner surfaces 25 fitted to the outer surfaces of the latter blocks. They also have outer cylindrically curved surfaces 26, formed about a common axial line radially of the engine, as is best illustrated in Figure 3, which are adapted to fit the inner surface of the bore 16. The construction is such that, when the blocks 18—18' are placed on opposite sides of the disk and the blocks 23—23' are placed thereon, all may be slipped into the bore 16 on the piston and will be held thereby in assembled relation.

By reason of mounting the roller disk on an inclined journal, reciprocation of the power driven pistons will impart a wabbling motion to the rocker disk which, in turn, imparts rotative motion to the shaft 5 and, owing to this manner of connecting the several pistons with the rocker disk, it is required that there be no fixed relation between the bearing members and the piston or the disk, but that the bearings 23—23' be permitted, as the pistons reciprocate, to move radially toward and from the shaft 5, and also that the disk 10 be permitted to move pivotally upon each bearing connection with the several pistons. Both of these movements are provided for in the present construction: The first in the slidable mounting of the blocks 23—23' within the bore 16 that extends in a radial direction with respect to the engine, and the latter in their movement circumferentially within the bore.

By reason of the manner in which the inner blocks are mounted on the disk and the manner in which the outer blocks are mounted on the inner blocks and are slidable within the bore, it is apparent that, as the shaft rotates, the disk will be given a certain wabbling motion which not only imparts rotative movement to the shaft but also through the connection imparts a certain rotative movement to the pistons in opposite directions as they reciprocate. This movement is illustrated in Figure 3, by means of the dotted line shown at 30, which is the course that would be inscribed, or followed, by a point on the piston as it moves reciprocally within the cylinder. This movement is very much desired, since it provides better and more even lubrication of the pistons and also prevents scoring or wear on the piston and cylinder walls.

In Figures 7 and 8, I have illustrated an alternative construction wherein the disk 10 has a scalloped periphery providing radial extensions 31 through which connection is made with the several pistons and which, instead of having the bearing blocks 18—18' mounted slidably thereon, as shown in the construction of Figure 1, each has a cylindrical head 32 cast integrally therewith in a tangential direction with the disk, which serve in the same manner as do the blocks 18—18' to provide bearing surfaces for the blocks 23—23'. This construction, as is shown in Figures 7 and 8, permits stronger piston construction, since the walls of the piston need not be cut away to so great an extent to provide for the passage of the disk, as is required in the previous construction. This design also prevents creeping of the disk during operation of the engine.

In Figure 9 I have illustrated an alternative construction for the inner bearing blocks, which do not have the guide flanges 22 at their ends.

In the bearing constructions disclosed, I have provided more easily assembled and less expensive constructions than formerly have been used, which provide better lubrication of the pistons, and which eliminate scoring and wear on the piston and cylinder walls to any great extent.

Having thus described my invention, what I claim as new therein and desire to secure by Letters-Patent, is:

1. The combination with a rotatably mounted shaft provided with a journal at an angle with respect to the axial line of the shaft, a piston operating in a line parallel with the shaft having a lateral bore therein opening toward the shaft and a rocker disk rotatably mounted on the journal having a peripheral portion extended within the bore of the piston, of bearing blocks disposed within the said bore at opposite sides of the disk with their outer surfaces fitted to the surface of the bore for slidable movement in a longitudinal and circumferential direction thereof, and with their inner surfaces pivotally engaging the opposite faces of the disk.

2. The combination with a rotatably mounted shaft provided with a journal at an angle with respect to the axial line of the shaft and a piston operating in a line parallel with the shaft, having a lateral bore therein opening toward the shaft, of a rocker disk rotatably mounted on the journal, having a peripheral portion extended within the bore of the piston and provided with cylindrically formed bearing surfaces on its opposite faces directed transversely of the bore, and bearing blocks disposed within the bore at opposite sides of the disk with their outer surfaces curved to fit the surface of the bore and their inner surfaces fitted for pivotal movement on the cylindrically formed bearing surfaces on opposite faces of the disk.

3. The combination with a rotatably mounted shaft having a journal thereon formed at an angle with respect to the axial line of the shaft, a piston operating in a line parallel with the shaft, having a laterally opening bore therein, of a rocker disk mounted rotatably on the journal with the portion extending within the bore of the piston, bearing blocks mounted on the opposite faces of the disk and connected for slidable movement thereon circumferentially of the disk; said blocks having cylindrically formed outer surfaces directed transversely of the bore, other blocks mounted upon the first named blocks, having their outer surfaces fitted to the surface of the bore to slide longitudinally and circumferentially therein, and with their inner faces fitted to the cylindrical surfaces of the first named blocks.

4. The combination with a rotatably mounted shaft having a journal formed thereon at an angle with respect to its axial line, and a piston operating in a line parallel with the shaft and having a cylindrical bore therein opening in the direction of the shaft, of a rocker disk mounted rotatably upon the journal with a peripheral portion extending into the bore of the piston, a pair of bearing blocks having flat surfaces fitted to the opposite sides of the disk and connected for slidable movement circumferentially on the disk, and having cylindrically curved, outer surfaces extending transversely of the bore, another pair of blocks fitted upon the first named blocks to move pivotally thereon and having outer surfaces fitted to the walls of the bore for slidable movement therein.

5. The combination with a rotatably mounted shaft having a journal thereon formed at an angle with respect to the axial line of the shaft, a piston operating in a line parallel with the shaft, having a laterally opening bore therein, of a rocker disk mounted rotatably on the journal with a peripheral portion extended within the bore of the piston; said disk having circumferential grooves formed therein, bearing blocks disposed against opposite faces of the disk, having guide ribs formed thereon slidable within the grooves and having cylindrically formed, outer surfaces directed transversely of the bore with flanged end portions, other bearing blocks disposed upon the first named blocks, having inner cylindrically curved surfaces fitted for pivotal movement upon the surfaces of the first named blocks between the flanges thereof, and having outer cylindrically curved surfaces fitted to the surface of the bore and slidable thereon.

Signed at Seattle, Washington, this 17th day of December, 1921.

JOHN O. ALMEN.